(12) United States Patent
Ghorbani Zarimahalleh et al.

(10) Patent No.: US 9,097,125 B2
(45) Date of Patent: Aug. 4, 2015

(54) INTENTIONALLY FREQUENCY MISTUNED TURBINE BLADES

(75) Inventors: Gholamreza Ghorbani Zarimahalleh, Karaj (IR); Reza Torabideh, Karaj (IR); Hamid Motamedi Zoka, Karaj (IR); Arash Jahangiri Zad, Karaj (IR)

(73) Assignee: MAPNA Group, Tehran (IR)

( * ) Notice: Subject to any disclaimer, the term of this patent is extended or adjusted under 35 U.S.C. 154(b) by 529 days.

(21) Appl. No.: 13/589,057

(22) Filed: Aug. 17, 2012

(65) Prior Publication Data

US 2014/0050590 A1 Feb. 20, 2014

(51) Int. Cl.
*F01D 5/16* (2006.01)
*F01D 5/10* (2006.01)
*F01D 5/14* (2006.01)
*F04D 29/66* (2006.01)
*F04D 29/32* (2006.01)

(52) U.S. Cl.
CPC *F01D 5/10* (2013.01); *F01D 5/141* (2013.01); *F01D 5/16* (2013.01); *F04D 29/666* (2013.01); *F04D 29/324* (2013.01); *F04D 29/327* (2013.01); *F05D 2260/961* (2013.01); *Y02T 50/673* (2013.01)

(58) Field of Classification Search
CPC ............. F01D 5/10; F01D 5/16; F01D 5/141; F04D 29/327; F04D 29/666; F05D 2260/961
See application file for complete search history.

(56) References Cited

U.S. PATENT DOCUMENTS

| | | | |
|---|---|---|---|
| 4,878,810 A * | 11/1989 | Evans | 416/203 |
| 5,286,168 A | 2/1994 | Smith | |
| 5,524,341 A * | 6/1996 | Ferleger et al. | 29/889.7 |
| 5,667,361 A * | 9/1997 | Yaeger et al. | 416/193 R |
| 6,379,112 B1 * | 4/2002 | Montgomery | 415/119 |
| 6,471,482 B2 * | 10/2002 | Montgomery et al. | 416/203 |
| 6,854,959 B2 * | 2/2005 | Barb | 416/1 |
| 7,147,437 B2 * | 12/2006 | Burdgick et al. | 416/1 |
| 7,383,136 B1 | 6/2008 | Griffin et al. | |
| 7,500,299 B2 | 3/2009 | Dupeux et al. | |
| 7,753,652 B2 | 7/2010 | Truckenmueller et al. | |
| 8,043,063 B2 | 10/2011 | Kelly et al. | |

* cited by examiner

*Primary Examiner* — Igor Kershteyn

(57) ABSTRACT

A new, more economical design for intentionally frequency mistuned turbine blades for more efficient turbine engines is disclosed. A rotating disk of a turbine engine includes first turbine blades that alternate between second turbine blades. The second turbine blades are thicker than the first turbine blades, within manufacturing tolerances, in sections from about their mean line to their airfoil tip. The first and second turbine blades can be cast using two different molds, resulting in an economical manufacturing method. As such, the natural frequency of the second turbine blades is about 3% less than the natural frequency of the first turbine blades. As a result of the intentional difference in natural frequencies of the two different turbine blades, the rotating disk does not experience flutter instability.

15 Claims, 5 Drawing Sheets

US 9,097,125 B2

INTENTIONALLY FREQUENCY MISTUNED TURBINE BLADES

TECHNICAL FIELD

This application generally relates to turbine engines, and more particularly relates to intentionally frequency mistuned turbine blades for increased flutter stability.

BACKGROUND

Flutter, i.e., self-excited vibrations of turbine blades, in turbine engines can lead to catastrophic failures in turbine components, such as compressors and turbine blades. Flutter is an aero-elastic instability that results from coupling between aerodynamic and inertial forces. This interaction causes unsteady aerodynamic forces acting on the blades leading to vibrations, which in large magnitudes, can cause structural failure. As such, the pressure and flow rate of turbine engines are limited to prevent flutter, which restricts the power output and/or efficiency of turbine engines.

It is well known that rotating disks with blades having identical vibration frequencies are more susceptible to flutter than rotating disks with blades having different vibration frequencies, i.e., intentionally frequency mistuned turbine blades. One known method to vary the vibration frequencies of blades in a rotating disk is to install adjacent blades having non-uniform natural frequencies. Referring to FIG. 1, to prepare blades having different natural frequencies using one known method, a portion of some blades is typically removed from the trailing edge of a turbine blade 10 to create a triangular-shaped void 12 at the airfoil tip of the blade 10. By removing the triangular-shaped void from the trailing edge of the blade 10, the natural frequency of the blade 10 is increased relative to an unmodified blade. Modified turbine blades 10 and unmodified blades are then adjacently installed around a rotating hub to create a rotating disk with improved flutter stability.

However, known methods for changing the natural frequency of turbine blades require the precise removal of material from the blades, which requires expensive machining of the blades, results in wasted raw material, and reduces the efficiency of the turbine engine. Therefore, a new, more economical design for intentionally frequency mistuned turbine blades for more efficient turbine engines is disclosed.

SUMMARY

A rotating disk for a turbine engine having intentionally frequency mistuned turbine blades is disclosed. The rotating disk includes a rotating hub, first turbine blades projecting from the circumference of the rotating hub, and second turbine blades projecting from the circumference of the rotating hub. The number of first turbine blades is equal to the number of second turbine blades. The first turbine blades alternate between the second turbine blades. The thickness of the second turbine blades from the mean line between their airfoil root and their airfoil tip to their airfoil tip is greater than the thickness of the first turbine blade from the mean line between their airfoil root and their airfoil tip to their airfoil tip. The natural frequency of the second turbine blades is lower than the natural frequency of the first turbine blades.

In some implementations, the first turbine blades can be connected to the rotating hub at their blade root and the second turbine blades can be connected to the rotating hub at their blade root. In some implementations, the first turbine blades and the second turbine blades can have the same leading edge, trailing edge, and camber line.

In some implementations, the thickness of the second turbine blades on their pressure side can be greater than the thickness of the first turbine blades on their pressure side and the thickness of the second turbine blades on their suction side can be greater than the thickness of the first turbine blades on their suction side.

In some implementations, the difference in thickness between the second turbine blades and the first turbine blades can range from 0.6% to 4% of the maximum blade thickness of the first turbine blades. The difference in thickness between the first turbine blades and the second turbine blades can be non-uniform along their camber lines.

In some implementations, the first turbine blades and the second turbine blades can be symmetric about their camber lines. In some implementations, the natural frequency of the second turbine blades can be about 3% less than the natural frequency of the first turbine blades.

In some implementations, the height of the first turbine blades between their airfoil root and their airfoil tip can be the same as the height of the second turbine blades between their airfoil root and their airfoil tip. The width of the first turbine blades between their leading edge and their trailing edge can be the same as the width of the second turbine blades between their leading edge and their trailing edge.

In some implementations, the first turbine blades and the second turbine blades can be made of the same material. The material can be a nickel-based super alloy. In other implementations, the first turbine blades and the second turbine blades can be made of different materials.

Details of one or more implementations and/or embodiments of the intentionally frequency mistuned turbine blades are set forth in the accompanying drawings and the description below. Other aspects that can be implemented will be apparent from the description and drawings, and from the claims.

BRIEF DESCRIPTION OF DRAWINGS

Like reference symbols indicate like elements throughout the specification and drawings.

DETAILED DESCRIPTION

A new, more economical design for intentionally frequency mistuned turbine blades for more efficient turbine engines is disclosed. A rotating disk of a turbine engine includes first turbine blades that alternate between second turbine blades. The second turbine blades are thicker than the first turbine blades, within manufacturing tolerances, in sections from about their mean line to their airfoil tip. The first and second turbine blades can be cast using two different molds, resulting in an economical manufacturing method. As such, the natural frequency of the second turbine blades is about 3% less than the natural frequency of the first turbine blades. As a result of the intentional difference in natural frequencies of the two different turbine blades, the rotating disk does not experience flutter instability.

Figure 2:
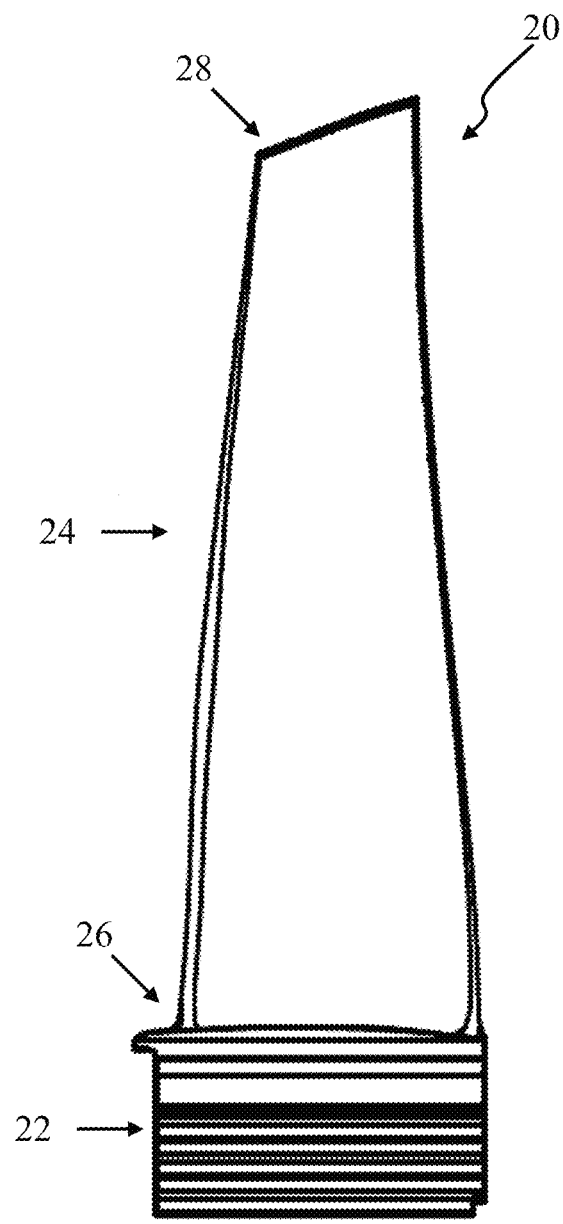
FIG. 2 illustrates an isometric view of a first turbine blade.

Referring to FIG. 2, an example of a first turbine blade 20 is shown. The turbine blade 20 is a free-standing blade that is manufactured separately from a rotating hub of a rotating disk. The first turbine blade 20 has a blade root 22 that is configured to fit into the rotating hub of the rotating disk and a blade airfoil 24. The blade airfoil 24 starts from an airfoil root 26 and extends to an airfoil tip 28.

Figure 3:
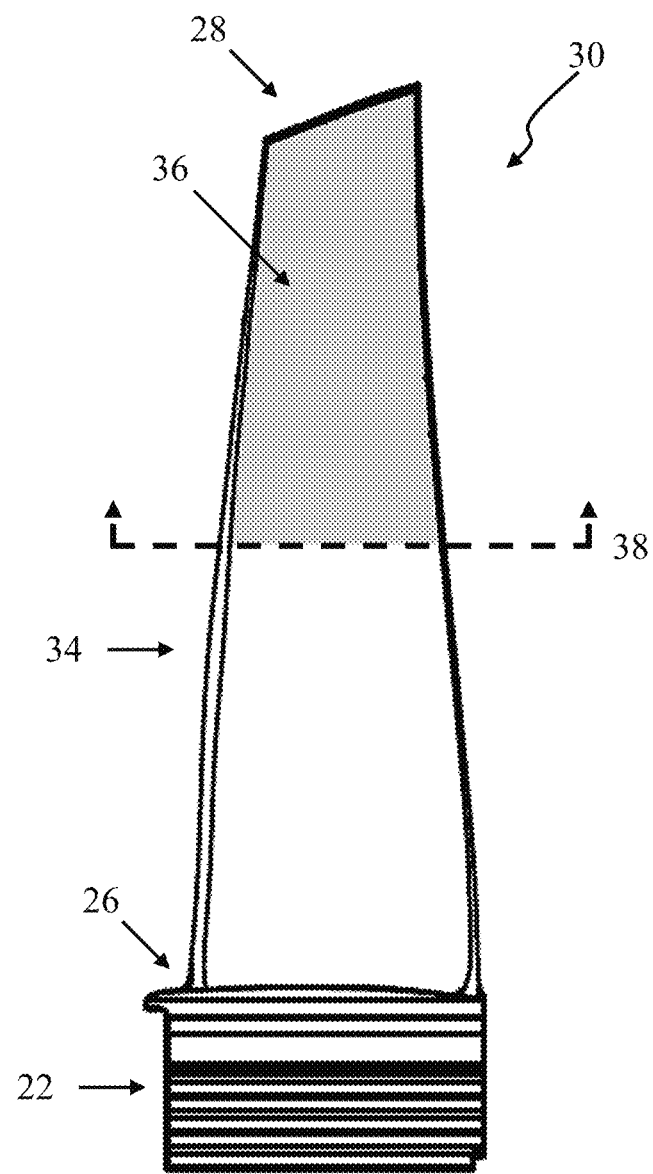
FIG. 3 illustrates an isometric view of a second turbine blade modified to be thicker than the first turbine blade from about its mean line to its airfoil tip.

Referring to FIG. 3, an example of a second turbine blade 30 is shown. The second turbine blade 30 is also a free-standing blade that is manufactured separately from the rotating hub of the rotating disk. The second turbine blade has the same blade root 22 that is configured to fit into the rotating hub of the rotating disk and a thickened blade airfoil 34. The thickened blade airfoil 34 also starts from the airfoil root 26 and extends to the airfoil tip 28. The height of the thickened blade airfoil 34 of the second turbine blade 30 is the same as the height of the blade airfoil 24 of the first turbine blade 20. In addition, the width of the thickened blade airfoil 34 of the second turbine blade 30 is the same as the width of the blade airfoil 24 of the first turbine blade 20.

The second turbine blade 30 is thicker in the area 36 from the mean line 38 between the airfoil root 26 and the airfoil tip 28, i.e., the mean line 38 of the thickened blade airfoil 34, to the airfoil tip 28 relative to the first turbine blade 20. The mean line 38 is located halfway between the airfoil root 26 and the airfoil tip 28. As such, the second turbine blade 30 has a lower natural frequency relative to the first turbine blade 20.

Figure 4:
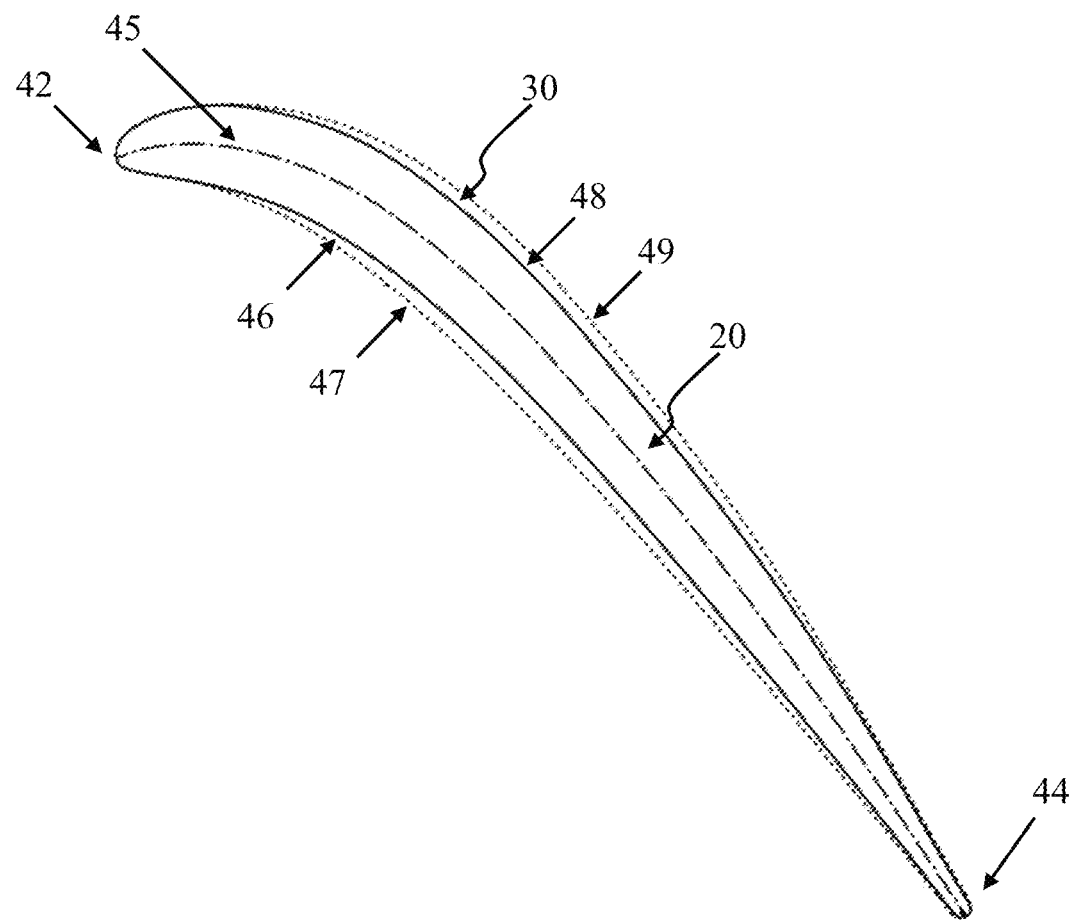
FIG. 4 illustrates a top view showing the airfoils of the first turbine blade of FIG. 2 and the second turbine blade of FIG. 3 along the mean lines of the turbine blades.

Referring to FIG. 4, a top view showing the airfoils of the first turbine blade 20 and the second turbine blade 30 is illustrated. Each airfoil has the same leading edge 42, trailing edge 44, and camber line 45. Both the airfoil of the first turbine blade 20 and the airfoil of the second turbine blade 30 are symmetric along the camber line 45. Because the second turbine blade 30 is thicker from the mean line 38 to the airfoil tip 28 on both its pressure side 47 and suction side 49, the airfoil area of the second turbine blade 30 is larger than the airfoil area of the first turbine blade 20.

In particular, the distance from the pressure side 46 of the first turbine blade 20 to the camber line 45 is less than the distance from the pressure side 47 of the second turbine blade 30 to the camber line 45, i.e., the pressure side thickness of the second turbine blade 30 is greater than that of the first turbine blade 20. Similarly, the distance from the suction side 48 of the first turbine blade 20 to the camber line 45 is less than the distance from the pressure side 49 of the second turbine blade 30 to the camber line 45, i.e., the suction side thickness of the second turbine blade 30 is greater than that of the first turbine blade 20. As such, the airfoil of the second turbine blade 30 is thicker than the airfoil of the first turbine blade 20.

As shown in FIG. 4, the difference in thickness between the first turbine blade 20 and second turbine blade 30 is non-uniform along the camber line 45 from the leading edge 42 to the trailing edge 44. The variation in thickness difference in needed to form the desired curvatures of the airfoil of the second turbine blade 30. In some implementations, for example, the difference in thickness between the second turbine blade 30 and the first turbine blade 20 can range from 0.6% to 4% of the maximum blade thickness of the first turbine blade.

Because the mass of the second turbine blade 30 near the airfoil tip 28 is greater than the mass of the first turbine blade 20 near the airfoil tip 28 without a significant difference in stiffness of the blades, the natural frequency of the second turbine blade 30 is less than the natural frequency of the first turbine blade 20. In particular, the natural frequency of the second turbine blade 30 was determined to be about 3% less than the natural frequency of the first turbine blade 20 in testing using the impulse hammer method. It should also be noted that the natural frequencies of two turbine blades did not significantly differ when a region near the airfoil root 26 was thickened. Therefore, only the region distal of the mean line 34 is thickened to create a difference in natural frequency.

Figure 5:
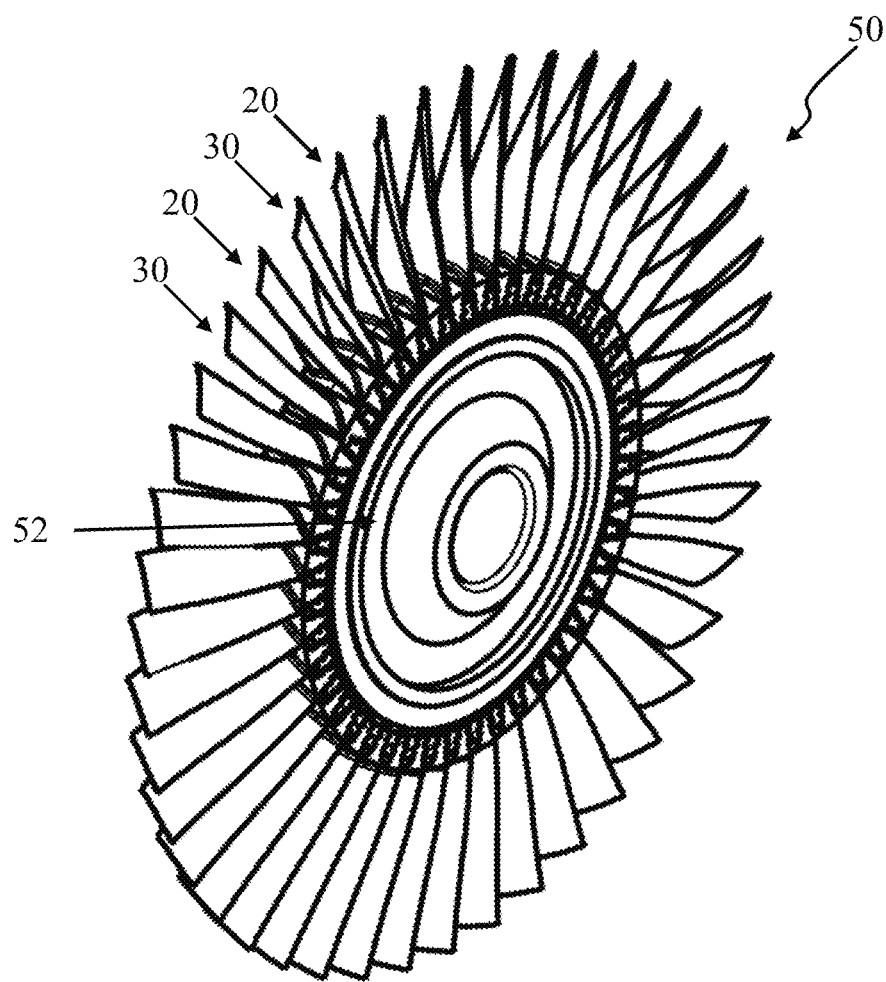
FIG. 5 illustrates an isometric view of a rotating disk having the first and second turbine blades adjacent to one another.

Referring to FIG. 5, a rotating disk 50 including first turbine blades 20 and second turbine blades 30 adjacent to one another is illustrated. Although only four of the blades have been referenced in FIG. 5, the entirety of the circumferential row of blades of the rotating disk 50 consists of the first turbine blades 20 and the second turbine blades 30 adjacent to one another. The first turbine blades 20 and the second turbine blades 30 are connected to a rotating hub 52 by the blade roots 22. As shown in FIG. 5, the rotating disk 50 has an even number of blades, half of which are the first turbine blades 20 and the other half of which are the second turbine blades 30 alternating between the first turbine blades 20. Because the natural frequency of the first turbine blades 20 differs from the natural frequency of the second turbine blades 30, the rotating disk 50 does not experience flutter instability.

The first turbine blades 20 and the second turbine blades 30 can be economically manufactured by casting the two different blades using two different molds, respectively. By using different molds rather than removing material from half of the blades after casting, the structural integrity of the first turbine blades 20 and the second turbine blades 30 is greater than previously known blades. In addition, the number of labor hours required to precisely modify the previously known blades increases the cost of the known turbine blades. However, using different molds to cast the first turbine blades 20 and the second turbine blades 30, no additional labor is required to modify the blades for intentional frequency mistuning, resulting in more economical turbine blades.

Figure 1:
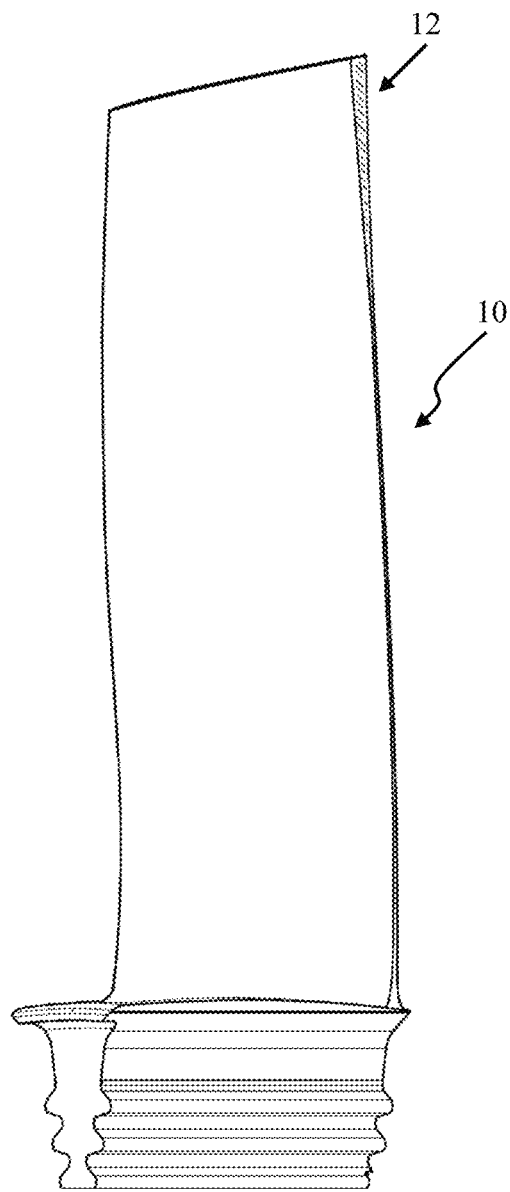
FIG. 1 illustrates a schematic view of a known turbine blade that has been altered to remove a triangular-shaped portion of its trailing edge.

In addition, because a portion of the second turbine blade 30 is not removed as in previous methods for intentional frequency mistuning, the surface area of the second turbine blade 30 is greater than the surface area of the turbine blade of FIG. 1 with the same height and width dimensions. As such, the output power produced by turbine engines using the second turbine blades 30 is greater than the output power of turbine engines using the known turbine blades of FIG. 1. For example, in a 160 MW power output gas turbine, an increase of 60 KW of power can be realized using the second turbine blades 30 in place of the known turbine blades of FIG. 1.

The rotating disk 50 can be used in any turbine engine, such as, for example, gas turbines, steam turbines, and/or jet engines. In some implementations, the first turbine blades 20 and second turbine blades 30 can be made of the same material, such as, for example, nickel-based super alloys. In other implementations, the first turbine blades 20 and second turbine blades 30 can be made of different materials.

In some implementations, the first turbine blades 20 and the second turbine blades 30 can be used in low pressure stages of turbine engines that require longer turbine blades, which have an increased likelihood of flutter.

It is to be understood that the disclosed implementations are not limited to the particular processes, devices, and/or apparatus described which may, of course, vary. It is also to be understood that the terminology used herein is for the purpose of describing particular embodiments only, and is not intended to be limiting. As used in this application, the singular forms "a," "an," and "the" include plural referents unless the content clearly indicates otherwise.

Reference in the specification to "one implementation" or "an implementation" means that a particular feature, structure, characteristic, or function described in connection with the implementation is included in at least one implementation herein. The appearances of the phrase "in some implementations" in the specification do not necessarily all refer to the same implementation.

Accordingly, other embodiments and/or implementations are within the scope of this application.

What is claimed is:

1. A rotating disk for a turbine engine having intentionally frequency mistuned turbine blades, comprising:
   a rotating hub,
   first turbine blades projecting from the circumference of the rotating hub; and
   second turbine blades projecting from the circumference of the rotating hub, wherein:
      the number of first turbine blades is equal to the number of second turbine blades,
      the first turbine blades alternate between the second turbine blades,
      the thickness of the second turbine blades from the mean line between their airfoil root and their airfoil tip to their airfoil tip is greater than the thickness of the first turbine blade from the mean line between their airfoil root and their airfoil tip to their airfoil tip, and
      the natural frequency of the second turbine blades is lower than the natural frequency of the first turbine blades.

2. The rotating disk of claim 1, wherein:
   the first turbine blades are connected to the rotating hub at their blade root, and
   the second turbine blades are connected to the rotating hub at their blade root.

3. The rotating disk of claim 1, wherein first turbine blades and the second turbine blades have the same leading edge, trailing edge, and camber line.

4. The rotating disk of claim 1, wherein the thickness of the second turbine blades on their pressure side is greater than the thickness of the first turbine blades on their pressure side.

5. The rotating disk of claim 1, wherein the thickness of the second turbine blades on their suction side is greater than the thickness of the first turbine blades on their suction side.

6. The rotating disk of claim 1, wherein:
   the thickness of the second turbine blades on their pressure side is greater than the thickness of the first turbine blades on their pressure side, and
   the thickness of the second turbine blades on their suction side is greater than the thickness of the first turbine blades on their suction side.

7. The rotating disk of claim 1, wherein the first turbine blades and the second turbine blades are symmetric about their camber lines.

8. The rotating disk of claim 1, wherein the difference in thickness between the second turbine blades and the first turbine blades ranges from 0.6% to 4% of the maximum blade thickness of the first turbine blades.

9. The rotating disk of claim 1, wherein the difference in thickness between the first turbine blades and the second turbine blades is non-uniform along their camber lines.

10. The rotating disk of claim 1, wherein the natural frequency of the second turbine blades is about 3% less than the natural frequency of the first turbine blades.

11. The rotating disk of claim 1, wherein the height of the first turbine blades between their airfoil root and their airfoil tip is the same as the height of the second turbine blades between their airfoil root and their airfoil tip.

12. The rotating disk of claim 1, wherein the width of the first turbine blades between their leading edge and their trailing edge is the same as the width of the second turbine blades between their leading edge and their trailing edge.

13. The rotating disk of claim 1, wherein the first turbine blades and the second turbine blades are made of the same material.

14. The rotating disk of claim 13, wherein the material is a nickel-based super alloy.

15. The rotating disk of claim 1, wherein the first turbine blades and the second turbine blades are made of different materials.

* * * * *